(12) United States Patent
Guarrero

(10) Patent No.: US 9,702,631 B2
(45) Date of Patent: Jul. 11, 2017

(54) SYSTEMS AND METHODS TO INSULATE COMPONENTS OF INDUSTRIAL INFRASTRUCTURE

(75) Inventor: Brett Guarrero, Telluride, CO (US)

(73) Assignee: Generative Technology Operatives, LLC, Erie, CO (US)

(*) Notice: Subject to any disclaimer, the term of this patent is extended or adjusted under 35 U.S.C. 154(b) by 782 days.

(21) Appl. No.: 13/344,931

(22) Filed: Jan. 6, 2012

(65) Prior Publication Data

US 2012/0175098 A1 Jul. 12, 2012

Related U.S. Application Data

(60) Provisional application No. 61/430,540, filed on Jan. 6, 2011.

(51) Int. Cl.

| | |
|---|---|
| *B65D 90/06* | (2006.01) |
| *F28D 7/02* | (2006.01) |
| *B65D 88/74* | (2006.01) |
| *B65D 90/02* | (2006.01) |
| *B65D 90/12* | (2006.01) |
| *F16L 59/14* | (2006.01) |

(52) U.S. Cl.
CPC ............ *F28D 7/024* (2013.01); *B65D 88/74* (2013.01); *B65D 90/02* (2013.01); *B65D 90/06* (2013.01); *B65D 90/12* (2013.01); *F16L 59/143* (2013.01); *F17C 2203/0329* (2013.01); *Y10T 137/7036* (2015.04); *Y10T 137/7039* (2015.04); *Y10T 137/8593* (2015.04)

(58) Field of Classification Search
CPC ........ Y10T 137/7036; Y10T 137/7039; B65D 88/128; B65D 88/744; B65D 88/748; B65D 88/74; B65D 90/02; B65D 90/06; B65D 90/12; F28D 1/0213
USPC ............ 220/592.25; 137/340, 375, 377, 382
See application file for complete search history.

(56) References Cited

U.S. PATENT DOCUMENTS

| | | | | |
|---|---|---|---|---|
| 1,370,531 | A * | 3/1921 | Fowler | B61D 5/04 |
| | | | | 105/362 |
| 4,044,517 | A * | 8/1977 | Schroter | 52/248 |
| 4,249,605 | A * | 2/1981 | Slater et al. | 166/266 |
| 4,376,489 | A * | 3/1983 | Clemens | 220/1.5 |
| 4,414,462 | A * | 11/1983 | Price | B61D 5/02 |
| | | | | 105/358 |
| 4,562,857 | A * | 1/1986 | Ball | 137/375 |
| 4,819,821 | A * | 4/1989 | Sharp | 405/53 |
| 5,493,837 | A * | 2/1996 | Hepler | 52/745.09 |

(Continued)

OTHER PUBLICATIONS

"Specification for Shop Welded Tanks for Storage of Production Liquids", American Petroleum Institute, API Specification 12F, Twelfth Edition, Oct. 2008, 38 pages.

*Primary Examiner* — Kevin Murphy
(74) *Attorney, Agent, or Firm* — O'Connor & Company; Ryan P. O'Connor

(57) ABSTRACT

This specification relates to systems and methods to insulate components of industrial infrastructure, such as tank systems and valve boxes used in association with oil wells. According to some implementations, a system includes a component to contain an outflow associated with industrial infrastructure; a foam arranged to insulate an exterior area associated with the component; a moisture barrier arranged to protect the foam; and a support structure to protect the foam from the weight of the component.

14 Claims, 4 Drawing Sheets

(56) References Cited

U.S. PATENT DOCUMENTS

| | | | | |
|---|---|---|---|---|
| 5,618,616 | A | * | 4/1997 | Hume et al. ............... 428/319.3 |
| 5,799,685 | A | * | 9/1998 | Tezuka et al. ................ 137/375 |
| 6,079,439 | A | * | 6/2000 | Hartley .......................... 137/377 |
| 6,328,183 | B1 | * | 12/2001 | Coleman .................... 222/185.1 |
| 6,712,089 | B1 | * | 3/2004 | Heflin ........................... 137/382 |
| 7,007,748 | B2 | * | 3/2006 | Gordon .................. F24D 3/082 |
| | | | | 165/163 |
| 2010/0154917 | A1 | * | 6/2010 | Batallas et al. .............. 138/141 |

* cited by examiner

SYSTEMS AND METHODS TO INSULATE COMPONENTS OF INDUSTRIAL INFRASTRUCTURE

CROSS REFERENCE TO RELATED APPLICATIONS

This application claims the benefit of priority from U.S. Provisional Application Ser. No. 61/430,540, filed Jan. 6, 2011 and entitled "SYSTEMS AND METHODS TO INSULATE COMPONENTS OF INDUSTRIAL INFRASTRUCTURE", which is hereby incorporated by reference.

BACKGROUND

This specification relates to systems and methods to insulate components of industrial infrastructure, such as tank systems and valve boxes used in association with oil wells.

The main problems with insulating materials are moisture saturation and moisture migration. Moisture saturation reduces the effectiveness of the insulation. In extreme cases, moisture causes some insulators to become conductors. In other cases moisture migrates, which can cause a host of other problems such as mold growth and propagation as well as a conduit for bacteria and virus transmission. There is structural degradation issues associated with moisture against metal used in components of industrial infrastructure.

SUMMARY

This specification describes systems and methods to insulate components of industrial infrastructure, such as tank systems and valve boxes used in association with oil wells.

In general, one or more aspects of the subject matter described in this specification can be embodied in a system that includes a component to contain an outflow associated with industrial infrastructure; a foam arranged to insulate an exterior area associated with the component; a moisture barrier arranged to protect the foam; and a support structure to protect the foam from the weight of the component.

Particular embodiments of the subject matter described in this specification can be implemented to realize one or more of the following advantages. A polyisocyanurate (PIR) foam and polyurea insulated system for a component (e.g., a tank or a valve box) can prevent the problems associated with traditional insulating materials by making a water proof system as tight as and similar to the way a roofing system keeps moisture from penetrating under layers. The PIR foam can provide excellent performance due to its temperature ratings for hot and cold, as well as its ability to resist fire and smoke propagation. The polyurea can be blended for a combination of UV resistance and elongation properties. Depending on the calculated Coefficient of thermal expansion or contraction for the given component (e.g., a tank or a valve box), the polyurea can be matched up to 600% elongation. The poly can be mixed with the entire pantone chart of pigments giving it the ability to either stand out brightly or be less obvious and blend into its surroundings. Moreover, the component (e.g., a tank or a valve box) may be above ground or below ground.

Another advantage of the described insulation methods and practices can be a significant reduction of the carbon footprint of industrial infrastructures. The highly effective insulation can reduce the thermal effects, such as heat loss, and can reduce the amount of energy required to keep the contents (e.g., fluids) of the components of industrial infrastructures at operating temperature.

The details of one or more embodiments of the subject matter described in this specification are set forth below. Other features, aspects, and advantages of the invention will become apparent from the description, the drawings, and the claims.

DETAILED DESCRIPTION

PIR Insulated Tank Systems with Polyurea Moisture Barrier Exterior

As noted above, tanks can be insulated using PIR foam and polyurea preventing undesired thermal effects (e.g., heat loss or heat gain). Some enhanced options for these tanks are the use of a stainless steel heat exchanger located internal to the tank, attached to the tank wall. The insulated tank system is applicable to static tanks such as American Petroleum Institute (API) tanks for fuel and industrial processes, American Society for Testing and Materials (ASTM), National Insulation Association (NIA), or American Society of Mechanical Engineers (ASME) compliant pressure vessels, heaters used in the oil and gas industry, water knock outs, condensate tanks, produced water tanks (e.g., from oil and gas wells) and high paraffin or tar sand oil applications, and food grade storage tanks as well as tanker cars and rail cars.

For example, in oil and gas wells, produced water can be the result of water being eliminated from product storage tanks and pipelines, which can be contaminated to a level, for example by paraffin oil buggering up the treatment solution, where it cannot be readily re-injected into the ground and therefore must go through a treatment process. The described pre-insulated tank can prevent this contamination by taking advantage of thermo dynamic processes, which separate the paraffin oil, entrained solids, from the fracturing process and salts. The result can be clean water that is ready for re-injection into the ground instead of relying on evaporation.

The drawings described below show various views of a pre-insulated tank design, a tank external coat banding, and support structure (e.g., dowel rods or stand-offs) close up. Pre-insulated tanks, as shown, are water proof and can be transported. The support structures can be insulated and hold the tank from crushing the insulation (e.g., HiTherm HT-300 or HT-450 from HiTHERM, LLC of Cerritos, Calif.). The coating or outer jacket can be Hi-therm polyurea, a blended base coat of aromatic and a top coat (UV stable) of aliphatic polyurea.

Figure 1:
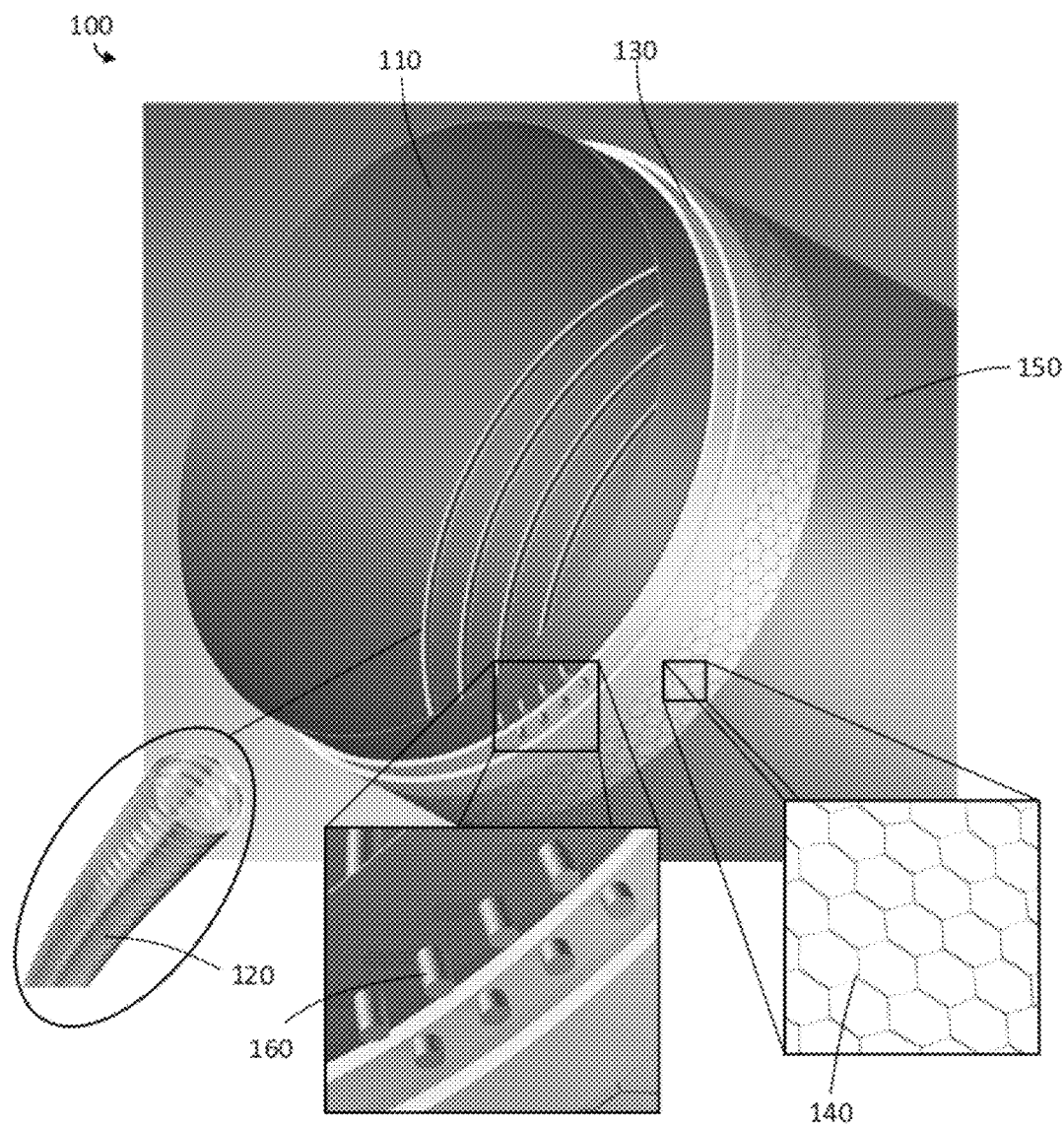
FIG. 1 shows an example of a pre-insulated tank system.

FIG. 1 shows an example of a pre-insulated tank system 100. The pre-insulated tank system 100 can include a core tank 110, a heat exchanger 120, an insulation layer 130, a mesh 140, a coating 150, and support structures 160. The core tank 110 can be a standard tank commonly used within the industry (e.g., made out of steel or fiberglass). In some implementations, the inner surface of the core tank 110 can be coated with polyurea (e.g., an aromatic blend that is designed specific to the liquid to be stored in the tank.) The support structures 160 can be attached to the tank, for example by gluing or welding processes, and protrude through the insulation layer 130 until flush with, or slightly elevated (e.g., 80 mil) above, the outer surface of the insulation layer 130. The measurement unit 'mil' or 'thou', as used throughout the specification, is a unit of length equal to 0.001 inch (thousandth(s) of an inch).

These support structures 160 can be insulated stand-offs or dowel rods. The support structures 160 can provide structural integrity to the insulation layer 130 and coating 150, preventing damage to the insulation layer 130 during transport of the pre-insulated tank system 100, even at highway speeds or off road deliveries. By integrating the support structures 160, the core tank 110 can be insulated before shipping, reducing (if not eliminating entirely) any special equipment required for the transport. Also, because the support structures 160 are integrated (e.g., permanently) no re-insulation of the tank may be necessary if the tank is moved, after being installed at one location, to another location. Therefore, the insulation layer 130 in combination with support structures 160 can provide a time and cost efficient solution. Moreover, the tanks can be assembled into a tank battery and become operational quickly.

In some implementations, the support structures 160 can be attached with PIR foam or construction adhesive such as elastomeric polymers. The foam PIR can be applied to the core tank 110, and a tool can be used to make cut outs in the foam that are slightly smaller than the outer diameter of the support structures 160. The support structures 160 can be dabbed with a fixadent, and set into place. The support structures 160 can be made from insulating material PIR in a liquid form, lightly expanded to maintain insulating properties and proportional strength characteristics.

In some implementations, the diameter of the support structures can be 2 inches, but may be increased or decreased based on tank diameter and weight. These support structures can be slightly longer (e.g., 80 mil) than the insulating layer thickness and serve as a depth gauge for the coating process. The coating 150 can completely cover the support structures, ensuring proper coating thickness. The support structures 160 can be integrated independent of the application of a mesh 140, and may not be visible with or without the mesh.

As described above, the insulation layer 130 can be PIR foam. The insulation layer 130 is wrapped around the core tank 110. Any desired thickness or number of layers can be used to create the insulation layer 130, depending on the requirements of the particular installation. The required thickness of the insulation layer can be determined by heat loss characteristics of the tank system and the desired maintained temperature for a liquid with a defined specific gravity and the specified heat source for British Thermal Units (BTUs). In some implementations, the thickness of the insulation layers can be 2-3 inches.

In addition, a mesh 140 can be wrapped around the insulation layer 130. The mesh 140 can hold the insulation layer 130 in place and act as a depth gauge for the coating 150. The mesh 140 can also act as reinforcement for the insulation layer 130, for example, to prevent damage to the insulation layer 130 if maintenance personnel step onto the tank surface. The mesh 140 can be industrial netting that is extruded, oriented, or made from various materials depending on the application and strength required, such as polymesh (e.g., polypropylene or polyethylene), cloth, hemp, and in some cases metal. In some implementations, the mesh 140 can be chicken wire mesh as shown in FIG. 1.

The coating 150 can be added around the insulation layer 130 or the mesh 140 and completely cover the pre-insulated tank, including the support structures 160, in a continuous layer with the least number of breaks (e.g., for fluid flow connections). The coating 150 can protect the insulation layer 130 from exposure to environmental conditions (e.g., water, UV, etc.). As described above, the coating 150 can be Hi-therm polyurea, a blended base coat of aromatic and a top coat (UV stable) of aliphatic polyurea. For example, the base coat can be an aliphatic or blended aromatic 50 mil coat, plus 30-50 mil of an aliphatic top coat to resist UV fading of colored tanks. In some implementations, the thickness of the complete coating 150 can be 80-100 mil or more. In some implementations, the coating 150 can act as a moisture barrier and can be wrapped or sprayed onto the insulation layer 130 or mesh 140.

In some implementations, the coating 150 can be added by spray on application, for example, the HiTherm HT-300 and HT-450. Other similar spray foam techniques can also be used in some implementations. For example, PUR or polyurethane foam in sheet stock or spray foam can also be used in some implementations. There are other products in board stock such as phenolic and polyisocyanurate (PIR) foam from Johns Manville of Denver, Colo., or extruded polystyrene foam (XPS) from The DOW Chemical Company of Midland, Mich. (blue or green board) or XPS Pink Board from Ownens Corning of Toledo, Ohio.

In some implementations, the tank 110 can be equipped with a heat exchanger 120. The heat exchanger 120 can be a stainless steel heat exchanger, for example, implemented as a spiral flex pipe as shown in FIG. 1. The heat exchanger 120 can be added to the interior of the core tank 110 to deliver the amount of heating necessary to keep the liquid contained in the tank 110 at acceptable temperatures. For example, the heat exchanger 120 can be a 63 mm or nearly 2.5" stainless steel spiral flexible pipe/hose×400 feet long, available from Brugg Pipesystems of US-Rome, Ga., or from Rovanco Pipe Systems of Joliet, Ill.

The heat exchanger 120 can start and end at flanges incorporated in the wall of the core tank 110, usually within about 2 to 4 feet of each other vertically. The integration of the heat exchanger 120 can eliminate the use of standard bayonet style electric heater or gas fire tube heaters and can, for example, replace a burner tube, allowing a mixed fuel source for heating the tank, which includes solar, natural gas (dry gas or wet gas) and other fuels such as low emitting bio-fuels. Moreover, the use of a spiral flex pipe, as opposed to corrugated pipe, can result in less breakage (e.g., from bending) and better heat transfer. Therefore, with the internal heat exchanger 120 described above, tanks can be grouped onto a central heating system and replace individual heaters, which otherwise may be required for each tank.

Figures 2A, 2B:
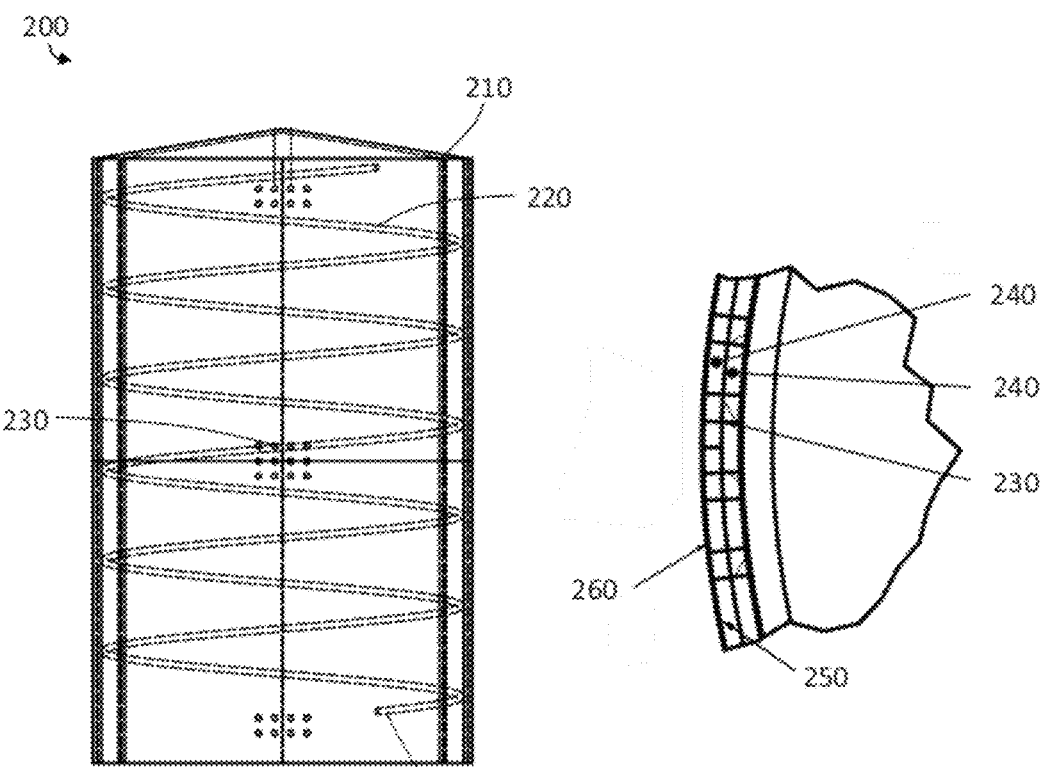
FIG. 2a shows another example of a pre-insulated tank system.
FIG. 2b shows a detail view of a core tank, insulation layers, support structures, mesh, and coating.

FIG. 2a shows another example of a pre-insulated tank system 200 and FIG. 2b shows a detail view of the core tank, insulation layer, support structures, mesh, and coating. The tank system 200 can include a core tank 210, heat exchanger 220, support structures 230, insulation layers 240, a mesh 250, and a coating 260. The heat exchanger 220 can be attached to the interior of the core tank 210 as described above with respect to FIG. 1. The support structure 230 can be stand offs or dowel rods glued or otherwise attached to the outer surface of the core tank 210.

In some implementations, the top of the core tank 210 can be arranged in a conical shape. The build process of the top of the tank can be identical to the sides and bottom of the tank. As described above, the core tank 210 can be covered with insulation layers 240 (e.g., PIR foam), a mesh 250 and a contiguous layer of coating 260 (e.g., polyurea.)

In some implementations, a heat exchanger 220 can be integrated in the core tank 210 as described above. When used in the oil and gas industry, the integration of the heat exchanger 220 can provide that the top of the tank does not build up with paraffin that can trap gases that may have to be relieved via a roof vent, which may cause a dangerous situation. The use of the heat exchanger 220 can also ensure a proper thermodynamic process causing the liquids heated on the outer surfaces to flow inward towards the middle of the core tank 210, preventing the collection of paraffin on the tank walls.

In some implementations, the support structures 230 are arranged in patterns as shown in FIG. 2 to reduce the number of support structures 230 required and still provide the required structural integrity for transportation of the pre-insulated tank 200. The support structured 230 can be arranged such that the tank system 200 can be transported in a horizontal position. The size and quantity of the support structures 230 can be determined based on the size and weight of the tank system 200.

In some implementations, the support structures 230 extend from the outer surface of the core tank 210 to the outer surface of the insulation layers 240. Therefore, the length of the support structures 230 can be similar to the thickness of all insulation layers 240 combined. The support structures 230 can be completely covered with the mesh 250 and/or coating 260, and therefore may not be visible in the final product.

The insulation layers 240 can be wrapped around the core tank 210 as described above. The desired insulation of the core tank 210 can be achieved by using any desired number of insulation layers and insulation material thicknesses, depending on the particular installation. For example, in FIG. 2, the pre-insulated tank system 200 includes two insulation layers 240. The insulation layers 240 can be PIR foam typically available in sheet stock (e.g., 9-12 inches in width and 3-6 feet tall). In some implementations, the first insulation layer (i.e., inner layer) and the second insulation layer 240 (i.e., outer layer) can be each 1-2 inches thick for a total thickness of 2-4 inches (3 inches is most typical for applications under 200 F.)

The insulation layers can be structurally reinforced by adding a mesh 250 and protected by adding a coating 260 as described above. As described above, the mesh 250 can be industrial netting, for example polymer (e.g., Industrial Netting Product OF-1581) or metal (e.g., chicken wire) based dependent on the desired strength. In some implementations, the coating 260 can be a polyurea coat, typically 80-100 mil thick, where the coating can be applied in several layers, for example, an inner layer can be aromatic (e.g., 50 mil) and an outer layer can be aliphatic (e.g., 30-50 mil) if color fade is an issue, or the complete layer can be aromatic (e.g., 100 mil) if color fade is not an issue.

Figure 3:
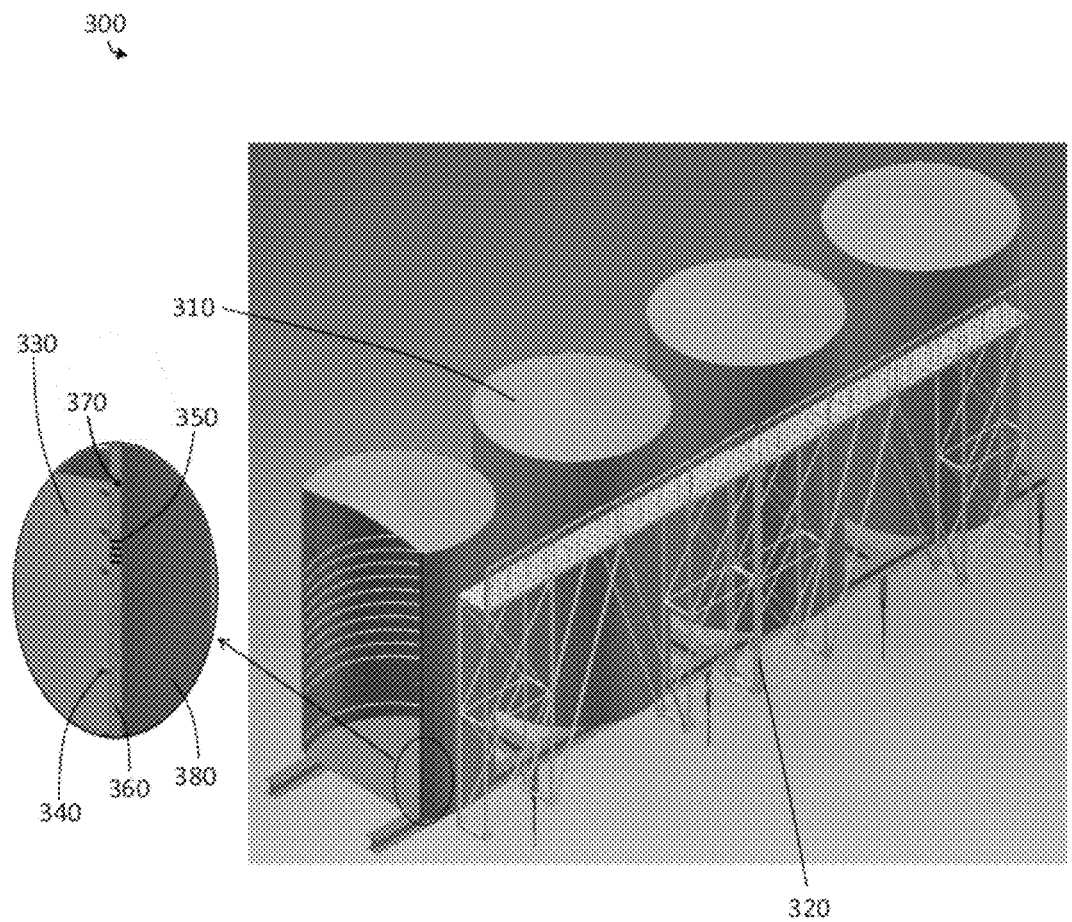
FIG. 3 shows an example of a pre-insulated tank infrastructure.

FIG. 3 shows an example of a pre-insulated tank infrastructure 300. The pre-insulated tank infrastructure 300 can include several pre-insulated tanks 310 (e.g., a tank battery) and a platform 320. The pre-insulated tanks 310 can be configured as described above, for example, by including a core tank 330, a heat exchanger 340, support structures 350, insulation layers 360, mesh 370, and coating 380. In some implementations, the cores of the pre-insulated tanks 310 can be made of steel, fiberglass, or plastic, and the inside surface of the pre-insulated tanks 310 can be lined with polyurea. The heat exchanger can be a stainless steel flexible tube (e.g., Niroflex or Spiraflex spiraled stainless steel from Brugg Rohrsystem AG of Kleindoettingen, Switzerland). The insulation layers can be PIR foam, such as HT-300 or HT-450, which is typically used in high temperature applications (e.g., when Therminol or other higher temperature transfer fluids are used).

The platform 320 can include one or more walkways and can be configured to provide access to the pre-insulated tanks 310, for example, for maintenance purposes. The platform 320 and all of its components can be galvanized to provide resistance to corrosion, particularly in Hydrogen Sulfide (H2S) environments. In some implementations, the platform 320 provides sufficient structural integrity such that the platform 320 is a self supporting and standing walk way and stair system, where attachment to the pre-insulated tanks 310 is not necessary. In some implementations, a safety band around a pre-insulated tank 310 may be attached to the platform 320, without penetrating the coating 380. Therefore, the protective coating 380 of the pre-insulated tanks 310 is not unnecessarily protruded by attachment hardware or structures, possibly exposing the insulation layers and core tank to moisture or other environmental conditions. In some implementations, the platform 320 can be installed in 20 foot sections, is mobile with the tank battery, and can be disassembled quickly and reassembled with every move of the tank battery.

PIR Insulated Valve Box Systems with Polyurea Moisture Barrier Exterior:

As noted above, valve boxes can be insulated using PIR foam and polyurea, preventing undesired thermal effects (e.g., heat loss or heat gain). These valve boxes can perform on average 300% more efficiently than non-PIR large pipe valve boxes. Moreover, some enhanced options for the valve box is the use of a leak detection system located internal to the valve box, with a solar battery charger alarm system attached to the valve box wall. This can send a contact closure to a relay turning on a pole mounted light-emitting diode (LED) light indicator all the way to a wireless modem sending a signal to a secure web server allowing an email to be sent or a text to a cell phone or pager.

The insulated valve box system is applicable to valve boxes such as API valve boxes for fuel and industrial processes, food process technology, biotech, pharmaceuticals, hydronic heating and cooling system systems and other thermal process applications. Pre-insulated heat traced valve boxes, as described, are water proof and can be transported without risking damage to the insulation material. Moreover, pre-insulated valve boxes can be light weight and can be safely opened and closed (e.g., by one person) preventing entrapment in a confined space and significantly reducing the risk of bodily injury.

Figure 4:
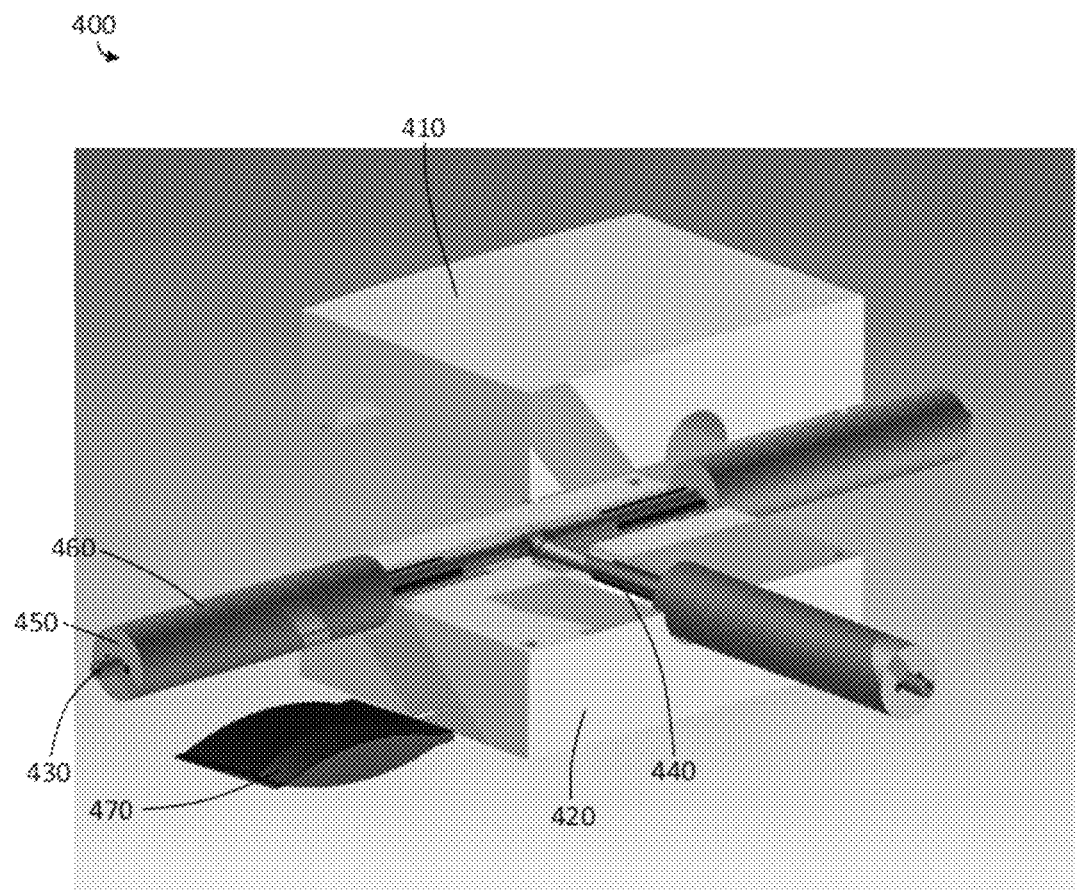
FIG. 4 shows an example of a pre-insulated valve box system.

FIG. 4 shows an example of a pre-insulated valve box system 400. The insulated valve box system can include a valve box top 410, a valve box bottom 420, carrier pipes 430, heat trace pipes 440, pipe insulation layers 450, outer pipe jacket 460, and a fluid capture bag 470. In some implementations, the valve box top 410 and valve box bottom 420 can be made from solid PIR layers (e.g., 3 inches thick or more) and can be covered with mesh and coating (e.g., polyurea) as described above with respect to tank systems. In some implementations, the valve box top 410 and valve box bottom 420 and/or the pipe insulation layers 450, can be reinforced with a mesh similar to the tank system described above with respect to FIGS. 1 and 2.

The carrier pipes 430 can be used for fluid and gas transfer, for example, in food processing, hydronic heating, hydraulic fracturing fluid or frac fluid, and petroleum products such as high paraffin oils. In some implementations, the carrier pipes can be made of cross-linked polyethylene (PEX), steel, or fiberglass. The heat trace pipes 440 can be used to transfer fluid at desired temperatures to provide heating or cooling for the carrier pipes 430. The carrier pipes 430 and heat trace pipes 440 can be covered by pipe insulation layer 450. The pipe insulation layers 450 can be made of PIR (e.g., HT-300 or HT-450.) The outer pipe jacket 460 can cover the pipe insulation layers 450. In some implementations, the outer pipe jacket 460 can be made from galvanized steel, PVC, polyethylene, or polyurea.

The fluid capture bag 470 can be integrated into the pre-insulated valve box system 400 to catch leaks that may occur, for example, when the valves or pipes in the valve box are worked on. A drain in a low point of the valve box system 400 can direct spilled fluids to the fluid capture bag 470. In some implementations, the fluid capture bag 470 can be configured to collect sunlight to keep the collected liquids warm during the day. A quick disconnect can be implemented, such that replacement of the fluid capture bag 470 can be quickly performed as necessary. A clear top layer in the valve box top 410 can be integrated, for example, to allow maintenance personnel to observe fluids collecting in the valve box system and assess whether servicing may be required.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, although particular embodiments of the invention have been described, other embodiments would be apparent to one of ordinary skill in the art and are within the scope of the following claims.

What is claimed is:

1. A pre-insulated transportable tank system comprising:
 a cylindrical core tank adapted for use with industrial infrastructure;
 a plurality of foam layers arranged to continuously cover and insulate an exterior area of the core tank, wherein the plurality of foam layers comprises polyisocyanurate (PIR) foam;
 a mesh wrapped around the plurality of foam layers;
 a polymer coating arranged to completely cover the mesh, the plurality of foam layers, and the core tank in a continuous and contiguous layer that protects the mesh, the plurality of foam layers and the core tank from environmental conditions, wherein the polymer coating comprises polyurea; and
 a plurality of support structures integrated with an exterior surface of the core tank and extending radially outward from the core tank through the foam layer, to the mesh, such that the weight of the core tank can be carried by the plurality of support structures during transportation of the pre-insulated transportable tank system;
 wherein the plurality of support structures extend beyond the plurality of foam layers and serve as a depth gauge in a process of applying the polymer coating, wherein the support structures are made from a different material than the polymer coating, and wherein the polymer coating completely covers the plurality of support structures after the process of applying the polymer coating is completed.

2. The pre-insulated transportable tank system of claim 1, wherein the industrial infrastructure comprises a well system.

3. The pre-insulated transportable tank system of claim 2, wherein the well system comprises an oil well.

4. The pre-insulated transportable tank system of claim 1, wherein the plurality of foam layers have a thickness of two to three inches.

5. The pre-insulated transportable tank system of claim 1, wherein the polymer coating is arranged to protect a subsurface in addition to the plurality of foam layers, and the polyurea of the polymer coating is adapted to expansion or contraction of the core tank up to 600% elongation of the polymer coating.

6. The pre-insulated transportable tank system of claim 5, wherein the subsurface comprises flat stock.

7. The pre-insulated transportable tank system of claim 5, wherein the subsurface comprises spray foam as one of the foam layers.

8. The pre-insulated transportable tank system of claim 1, wherein the plurality of support structures are stand offs.

9. The pre-insulated transportable tank system of claim 1, wherein the plurality of support structures are dowel rods.

10. The pre-insulated transportable tank system of claim 1, wherein the plurality of support structures are made from PIR that is lightly expanded to maintain insulating properties and proportional strength characteristics in the support structures.

11. The pre-insulated transportable tank system of claim 1, wherein the plurality of support structures are coupled with the exterior surface of the core tank via at least one of PIR foam, construction adhesives, or non-metallic welding.

12. The pre-insulated transportable tank system of claim 1, wherein the core tank comprises steel.

13. The pre-insulated transportable tank system of claim 1, wherein the core tank comprises fiberglass.

14. The pre-insulated transportable tank system of claim 1, wherein the polymer coating is the outermost layer of the pre-insulated transportable tank system.

* * * * *